United States Patent [19]

Stefely

[11] Patent Number: 5,421,127
[45] Date of Patent: Jun. 6, 1995

[54] FIRE STOP CLOSURE

[76] Inventor: Stephen F. Stefely, 941 Euclid Ave., Elmhurst, Ill. 60126

[21] Appl. No.: 174,324

[22] Filed: Dec. 30, 1993

[51] Int. Cl.⁶ ............................................. F16K 17/36
[52] U.S. Cl. ................................... 52/1; 52/220.8;
52/232; 52/317; 137/75; 169/48; 220/88.1;
251/10
[58] Field of Search ................ 52/1, 232, 220.2, 220.8,
52/317, 573.1; 137/72, 75; 220/88.1, 720;
251/10, 901; 248/219.2, 56, 325.1; 169/48, 91;
138/40, 137, 147

[56] References Cited

U.S. PATENT DOCUMENTS

| | | | |
|---|---|---|---|
| 4,018,983 | 4/1977 | Pedlow | 220/88.1 X |
| 4,109,423 | 8/1978 | Perrain | 52/1 |
| 4,136,707 | 1/1979 | Gaillot et al. | 52/1 X |
| 4,291,905 | 9/1981 | Schrock | 248/56 X |
| 4,559,745 | 12/1985 | Wexler | 52/1 |
| 4,796,401 | 1/1989 | Wexler | 52/1 X |
| 4,951,442 | 8/1990 | Harbeke, Jr. | 52/1 X |
| 5,103,609 | 4/1992 | Thoreson et al. | 52/232 |
| 5,253,455 | 10/1993 | Cross | 52/1 |

*Primary Examiner*—Carl D. Friedman
*Assistant Examiner*—Kevin D. Wilkens
*Attorney, Agent, or Firm*—John L. Hutchinson

[57] ABSTRACT

A closure for preventing transmission of fire and smoke through a wall or floor containing a plastic pipe when the pipe is destroyed by fire, which comprises a flexible fire retardant sleeve encircling the pipe adapted to automatically collapse about the plastic pipe as it is destroyed by fire and thus close off any opening to the next level or adjacent area.

9 Claims, 1 Drawing Sheet

U.S. Patent   June 6, 1995   5,421,127
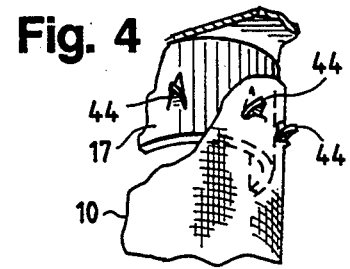
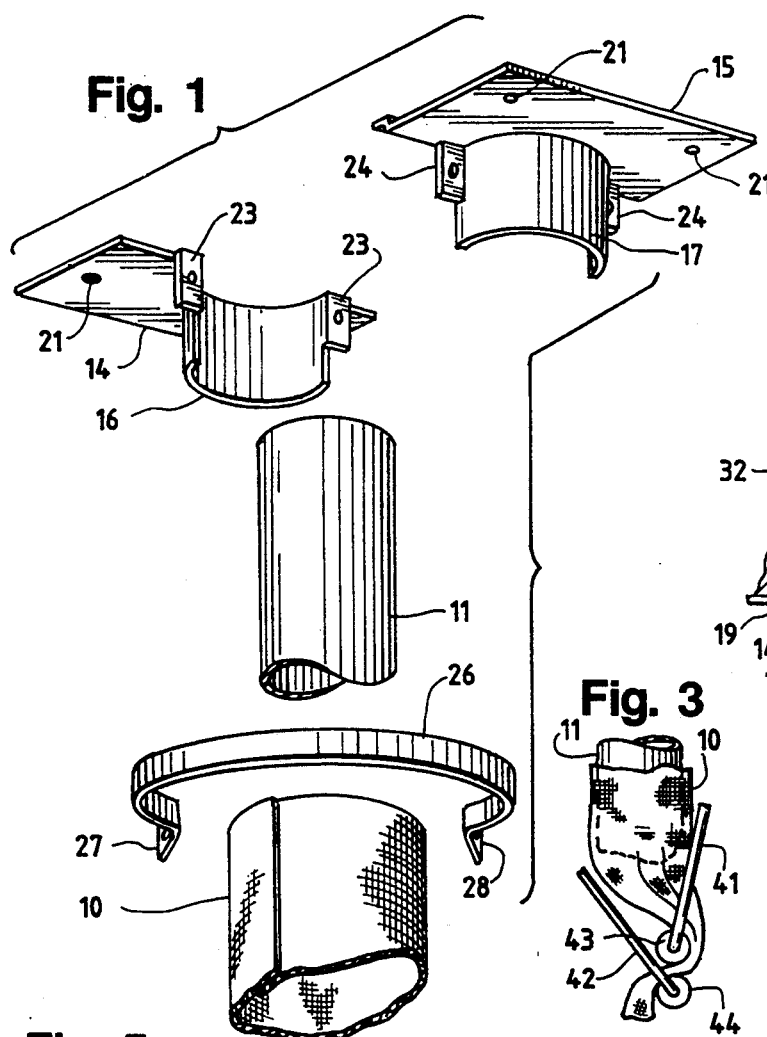
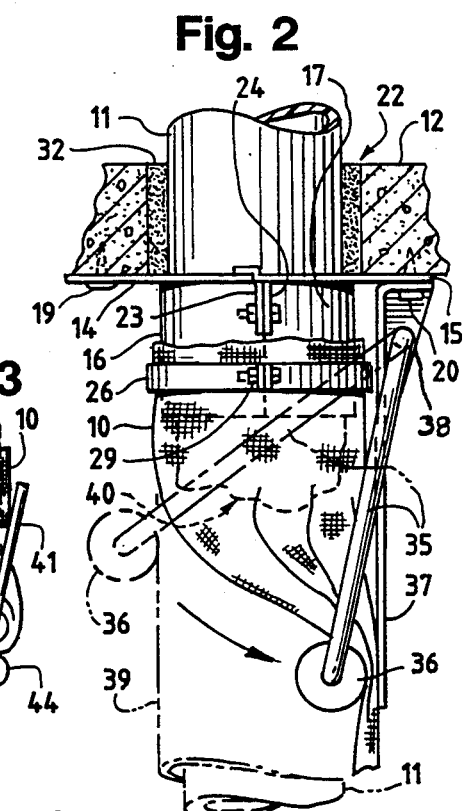
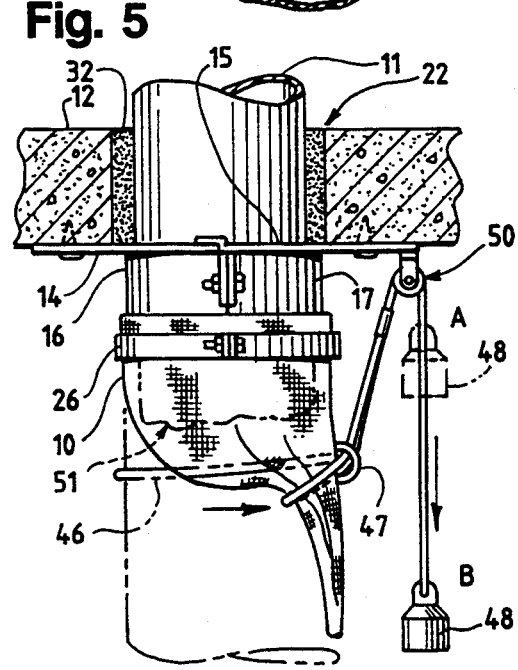
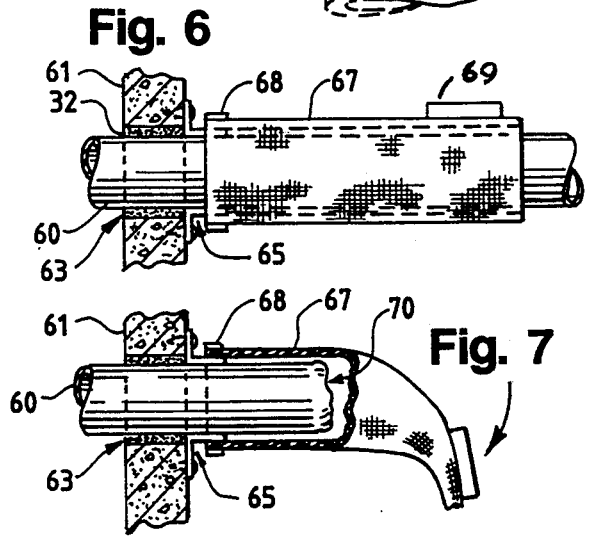

FIRE STOP CLOSURE

The present invention relates to a closure means for preventing the transmission of fire and smoke through a wall or floor containing a plastic pipe when the pipe is destroyed by fire.

Many buildings contain plastic pipe extending through a floor or wall for transmission of fluids, etc. Such pipes are frequently formed from a plastic such as polyvinyl chloride. In the event of a fire, the plastic pipe will normally be destroyed leaving an opening through which fire and smoke can be quickly transmitted to the next-level or adjacent area. Various means have been developed in an attempt to prevent the transmission of fire and smoke upon destruction of the plastic pipe.

One particular concept for filling the void created by a destroyed pipe involves the use of an intumescent fire retardant sealant or caulking activated by the heat from a fire. The intumescent sealant is disposed around the pipe and as the pipe is destroyed expands to fill the resultant void. Numerous techniques and systems for using the sealant or caulking are disclosed in the Fire Resistant Directory 1991 published by Underwriters Laboratory. Various patents also disclose means for holding the sealant or caulking in place, such as U.S. Pat. No. 5103609. Other prior art discloses mechanical means with or without caulking for closing the void created by a destroyed pipe, such as the disclosure in U.S. Pat. No. 3726050 and in my copending application, Fire Stop Device, Ser. No. 08/025 161, filed Mar. 1, 1993, now U.S. Pat. No. 5,301,475 issued Apr. 12, 1994.

All of the foregoing devices or concepts serve the purpose to one degree or another, however, I have developed a further device which has additional features of reducing cost and increasing efficiency and simplicity of installation. My invention involves the use of a fire retardant sleeve installed so as to surround a plastic pipe. Upon destruction of the pipe the fire retardant sleeve is adapted to automatically collapse on itself or against a surface thereby closing the resultant void or opening created by the destroyed pipe. An outstanding feature of my sleeve concept is the fact that it can be installed with an existing pipe already in place or with a new pipe installation. Further, it can be used with or without the customary intumescent caulking.

In the drawings

FIG. 1 is an exploded elevation of a base adapted to be secured to a floor or wall and the fire retardant sleeve which is adapted to be attached to the base.

FIG. 2 is an elevation, partly in section, illustrating one means of collapsing the fire retardant sleeve.

FIG. 3 is an elevation, partly in section, illustrating another means for collapsing the fire retardant sleeve.

FIG. 4 is an elevation, partly in section, showing an alternate means for attaching the fire retardant sleeve to a base or support.

FIG. 5 is an elevation, partly in section, illustrating a further means for collapsing the fire retardant sleeve.

FIG. 6 is a horzontal view, partly in section, illustrating a plastic pipe passing through a vertical wall and the associated fire retardant sleeve.

FIG. 7 is a horizontal view similar to FIG. 6 illustrating the collapsed sleeve upon destruction of the plastic pipe.

Turning now to the drawings and a detailed description of the invention reference will be made initially to FIGS. 1 and 2 wherein the numeral 10 designates a fabric type, flexible, tubular fire retardant sleeve forming the basic feature of this invention. The fire retardant tubular sleeve is adapted to fit over and completely encircle and extend longitudinally along a plastic pipe 11 passing through a wall or floor 12.

The flexible fire retardant sleeve is preferably formed from ceramic fiber capable of withstanding temperatures which would destroy a plastic pipe and preferably at least 1500° F. which is well above the temperature required to destroy normal plastic pipe. The chemical constituency of such fibers comprises various ratios of alumina, silica, zirconia and oxides of calcium, magnesium and chromium. Ceramic fiber of this nature is manufactured by the 3M Company under the trademark NEXTEL. Thermal Ceramics of Augusta, Georgia also has available similar products under the names KAO-WOOD and KAO-TEX.

To secure the sleeve 10 to the floor or wall and support it in position about plastic pipe 11 there are provided two complementary metal base members or plates 14 and 15 from which depend semi circular complementary sleeves 16 and 17 similar to those described in my aforementioned copending application. As shown in FIG. 2, the complementary base members 14 and 15 are adapted to be secured to the undersurface of the floor 12 by screws 19 and 20 passing through holes 21 into the floor. When in position the base members 14 and 15 will completely surround and close a transverse opening 22 in the floor 12 except for the area through which the plastic pipe 11 passes to the next level as shown in FIG. 2. The depending sleeves 16 and 17 will be secured together by means of lugs 23 and 24 projecting laterally and secured by corresponding bolts and nuts as shown, thereby forming a circular collar surrounding the plastic pipe 12.

As illustrated in FIGS. 1 and 2, the fire retardant sleeve 10 is normally intended to be attached to and supported by the collar formed by the sleeves 16 and 17. One means for securing the sleeve 10 to the collar comprises a circular clamp 26, which, after the sleeve is in position on the collar, will be placed on the outside part of the sleeve immediately surrounding the collar. The clamp 26 is secured in place to hold the sleeve by means of lugs 27 and 28 attached to each end of the bracket and a bolt and nut arrangement 29 as shown in FIG. 2.

For new pipe installations the sleeve 10 may be a unitary or a continuous predesigned tubular or circular construction resembling a stocking. However, for use with an existing pipe installation, in particular, the tubular sleeve may be formed from a flat fire retardant flexible mat or cloth and wrapped around the pipe. The wrapped around overlapping edges of the mat may be secured together in any suitable manner, not shown, such as by a fire retardant adhesive, staples, clips or prongs and eyelets.

If necessary and for increased protection a fire retardant intumescent caulking 32 may be deposed between the plastic pipe 11 and the surface of the opening 22 as shown in FIG. 2 and other FIGS. of the drawings, respectively.

Referring further to FIG. 2, numeral 35 designates an arm or lever extending across one side of the sleeve and pipe and to which is attached on its lower extremity a weighted roller 36. The upper end of the lever 35 is pivotally attached on the opposite side of the pipe and sleeve from that of roller 36 to the upper flared side 38 of an elongated metal L-shaped member or bracket 37, which in turn, is secured at its top by its shorter leg to the undersurface of the floor. The longer leg of bracket 37 extends downwardly along the outer surface of the sleeve 10 surrounding the pipe 11 having a width substantially equivalent to that of the pipe and sleeve. As shown, the bracket 37 can be attached to and supported by the same bolt 20 as used to secure base member 15 to the undersurface of the floor 12. Further, as illustrated, the long leg of bracket 37, comprising substantially a flat elongated surface, is intended to extend a sufficient distance below the floor 12, at least the length of the sleeve 10, so as to enable weighted roller 36 to squeeze or collapse the sleeve between the weighted roller and the lower surface of the bracket 37, after destruction of pipe 11 by fire, as hereinafter described.

In the embodiment of FIG. 2, the initial or unactivated position of the various components are illustrated and outlined by dotted lines. Surrounding the pipe 11 and closing off opening 22 except for the area through which pipe 11 passes are the complementary base members 14 and 15 and the collar formed by sleeves 16 and 17. The position of the flexible fire retardant sleeve 10 prior to destruction of the plastic pipe is shown partly in dotted lines, as indicated by the numeral 39, and held on or secured to the collar by circular clamp 26. The lever 35 and associated weighted roller 36 are in the up or unactivated position with the roller 36 resting against the sleeve and supported in position by the underlying plastic pipe 11.

As the result of a fire the lower extremity of the plastic pipe will be destroyed leaving an end which has receded into the sleeve 10 designated by the numeral 40 indicated by dotted lines. As the pipe is destroyed beyond the lower extremity of the sleeve, the lever and weighted roller will begin to move transversely of the sleeve due to gravity action in the direction of the arrow shown in FIG. 2. As the weighted roller 36 continues to move, it will completely collapse and squeeze one side of the lower end of the sleeve 10 against its opposite side and the lower end or stationary surface of the flat longer leg of elongated bracket 37 to close off the end of the pipe. While a weighted roller is shown for ease of movement, a non rotating gravity activated mass or weight of sufficient width could be attached to the lever 35 to insure collapsing of the sleeve against the bracket 37. The width of the lower end of bracket 37 and the roller or weight 36 should be sufficient to extend across the width or diameter of the sleeve 10 so that in operation the collapsed end of the sleeve completely closes access to the next level or area which might otherwise leave an open passageway for spread of fire on destruction of the plastic pipe.

As an alternate to the mechanism of FIG. 2, the embodiment of FIG. 3 can be used. In this embodiment two levers 41 and 42 pivoted on opposite sides of and extending across the sleeve may be installed with associated gravity activated rollers or weights 43 and 44, respectively, attached to the levers. As shown, when activated by gravity, the two levers and associated rollers move in opposite directions to squeeze or collapse the sleeve 10 between the rollers insuring that the collapsed sleeve closes any access to the next level upon destruction of the plastic pipe.

FIG. 4 illustrates an alternate method of securing the sleeve to the collar formed by metallic sleeves 16 and 17. In this embodiment the sleeves are provided with external hooks or projections 44 shown on sleeve 17 over which the upper end or circumference of sleeve 10 is forced to hold and support the sleeve 10 in place.

FIG. 5 represents a further alternate means for collapsing the sleeve 10 upon destruction of the plastic pipe 11. In this figure there is shown the floor 12 with an opening 22 through which a plastic pipe 11 passes to a next level. Between the pipe and the surface of the opening 22 an intumescent caulking 32 may be disposed. The numerals 14 and 15 designate the aforementioned base members or plates and the numerals 16 and 17 the previously described associated depending sleeves 16 and 17 forming a collar surrounding the plastic pipe.

In order to collapse the fire retardant sleeve in this embodiment of FIG. 5 a fire retardant rope or cord 46 encircles the sleeve 10. One end of the rope or cord has a loop or eyelet 47 and the other end passes through the loop 47 and is attached to a weight 48, as shown, by means of a pulley assembly 50 attached to the underside of floor 12. In the unactivated position the rope or cord 46 encircles the outside or circumference of the sleeve 10 which is supported in position by the underlying plastic pipe 11. Upon destruction of the plastic pipe by fire beyond the lower extremity of the sleeve, the lower end of the destroyed pipe recedes to the position indicated in dotted lines by the number 51. Without support of the pipe for the rope or cord the weight 48, under gravity activation, falls from position A to position B as indicated by the arrow. The action of the weight 48 causes the encircling loop of the rope or cord 46 to tighten about sleeve 10 and squeezes or collapses the lower end of sleeve 10 preventing access of fire or smoke to the next level, which would normally result upon destruction of the plastic pipe 11.

FIGS. 6 and 7 are intended to illustrate the basic principles of the invention when applied to horizontal pipe passing through a wall. In these figures the pipe 60 is shown passing through wall 61 with an intumescent caulking 32 installed between the pipe and the surface of the transverse opening 63. Attached to the wall are aforementioned base members or plates and the associated collar, indicated generally by the numeral 65, which have been described in more detail hereinabove.

Encircling and extending longitudinally over the plastic pipe 60 is a flexible fire retardant sleeve 67 which, as described above, is secured to the collar 65 and thus the wall by the clamp 68. Attached to the upper side on top of the sleeve is a weight 69.

In operation, as the pipe 60 is destroyed by fire and recedes into the sleeve as indicated by the numeral 70, the weight will automatically cause the upper portion or upper side of the flexible sleeve to drop down against the lower portion or side of the sleeve to close access to the void left by the pipe and thus transverse opening 63.

It will be appreciated that various modifications can be made without changing the basic concept. For example, where appropriate, spring means may be used to collapse the sleeve in lieu of a gravity activated mass. Further, for specific applications the sleeve may be other than tubular. Also, it will be appreciated that the action of collapsing the sleeve is one of progression as the pipe is destroyed by fire and recedes into the sleeve. Normally, the sleeve should extend along the pipe a distance that is greater than the exterior diameter of the pipe to insure that the final collapsed position of the sleeve will completely seal off the opening. Further, it will be understood that means other than the plates and collar may be used to secure the sleeve to the wall or floor so long as said means has a fire retardancy substantially equivalent to that of the fire retardant sleeve and the opening through the floor or wall is closed except for the area through which the pipe passes.

Having described the invention and certain embodiments thereof, the same is only limited by the scope of the following claims.

I claim:

1. A closure for preventing access by fire or smoke to a transverse opening in a wall or floor of a building having a plastic pipe extending through said opening when said pipe is destroyed by fire comprising
   a. A flexible fire retardant sleeve capable of withstanding at least 1500° F. without being destroyed by fire secured to said wall or floor encircling and extending longitudinally along said pipe.
   b. Means for automatically collapsing said sleeve so as to close said opening when said plastic pipe is destroyed by fire, which means is adapted to move transversely of said sleeve so as to force at least one side of said sleeve against its opposite side.

2. A closure as described in claim 1 wherein said means for automatically collapsing said sleeve is gravity activated. A closure as described in claims 2 wherein said means is gravity activated.

3. A closure as described in claim 2 wherein said means for automatically collapsing said sleeve comprises a gravity activated mass adapted to rest against one side of said sleeve prior to said plastic pipe's destruction, said gravity activated mass is attached to and held in place by a lever pivoted on the opposite side of said sleeve.

4. A closure as described in claim 3 which includes a stationary surface extending longitudinally along that side of the sleeve opposite the side provided with the gravity activated mass which surface cooperates with said mass to collapse said sleeve when said mass is activated.

5. A closure as described in claim 3 which includes a second gravity activated mass disposed on the side of said sleeve opposite of that of the first mass and correspondingly held in position by a lever pivoted on the side of said sleeve opposite of said second mass.

6. A closure as described in claim 1 wherein the means for collapsing said sleeve comprises a fire retardant cord encircling said sleeve adapted to automatically tighten about said sleeve as the pipe is destroyed, said cord is automatically tightened by gravity activated means comprising a mass attached to one end of said cord.

7. A closure for preventing access by fire or smoke to a transverse opening in a wall or floor of a building having a plastic pipe extending through said opening when said pipe is destroyed by fire capable of withstanding at least 1500° F. without destruction by fire comprising
   a. A base adapted to be attached to the surface of the wall or floor surrounding and closing said opening except for the area through which the pipe extends.
   b. An elongated collar attached to and extending at right angles to said base adapted to surround said pipe.
   c. A flexible fire retardant sleeve secured to said collar encircling and extending longitudinally along said plastic pipe.
   d. Means for automatically collapsing said sleeve so as to close said opening upon destruction of said plastic pipe by fire.

8. A closure as described in claim 7 wherein the means for automatically collapsing said sleeve is gravity activated.

9. A closure for preventing access by fire or smoke to a transverse opening in a wall or floor of a building having a plastic pipe extending through said opening when said pipe is destroyed by fire comprising
   a. A flexible fire retardant sleeve capable of withstanding that temperature which would destroy said pipe; said sleeve being adapted to encircle and extend longitudinally along said pipe.
   Means for securing said sleeve to said wall or floor which completely surrounds and closes said transverse opening except for the area through which the plastic pipe passes and which has a fire retardancy at least equivalent to that of the sleeve.
   c. Means which moves transversely of said pipe for automatically collapsing said sleeve so as to close said opening when said pipe is destroyed by fire.

* * * * *